United States Patent [19]

Schofield et al.

[11] Patent Number: 5,241,388
[45] Date of Patent: Aug. 31, 1993

[54] VIDEO SIGNAL FILTER METHOD AND CIRCUIT

[75] Inventors: Ronald D. Schofield; Larry F. deLuiter; William J. Fretz, all of Ridgecrest, Calif.

[73] Assignee: The United States of America as represented by the Secretary of the Navy, Washington, D.C.

[21] Appl. No.: 941,817

[22] Filed: Sep. 8, 1992

[51] Int. Cl.⁵ .............................................. H04N 5/21
[52] U.S. Cl. .................................... 358/167; 358/172
[58] Field of Search .................... 358/166, 167, 37, 36, 358/177, 171, 172, 340, 155; 328/162, 165

[56] References Cited

U.S. PATENT DOCUMENTS

| | | | |
|---|---|---|---|
| 3,851,260 | 10/1974 | Colin | 328/151 |
| 4,220,926 | 9/1980 | Buckner | 328/165 |
| 4,374,362 | 2/1983 | Sutherland et al. | 328/162 |
| 4,891,704 | 1/1990 | Vonk et al. | 358/143 |

Primary Examiner—Victor R. Kostak
Assistant Examiner—Nathan J. Flynn
Attorney, Agent, or Firm—Harvey A. Gilbert; Melvin J. Sliwka; John L. Forrest, Jr.

[57] ABSTRACT

A video signal filtering circuit and method includes the operative steps of receiving unfiltered high-state and low-state components of a video signal being substantially equally injected with electromagnetic noise, subtracting the unfiltered high-state and low-state components of the video signal one from the other so as to thereby produce a first signal having a DC offset component and an AC data-containing component free of noise, removing the DC offset component from the first signal and passing the noise-free AC data-containing component, clamping the first signal to a preset DC reference level corresponding to a specified sync level of a standard video signal so as to thereby produce a second signal having the AC data-containing component free of noise and being clamped to the preset DC reference level, and isolating the second signal from external electronic disturbances so as to produce a noise-free AC data-containing reference level-clamped output signal for providing a filtered high-state component having syncs stabilized to the specified sync level of the standard video signal to replace the original unfiltered noise-injected high-state component of the video signal.

15 Claims, 2 Drawing Sheets

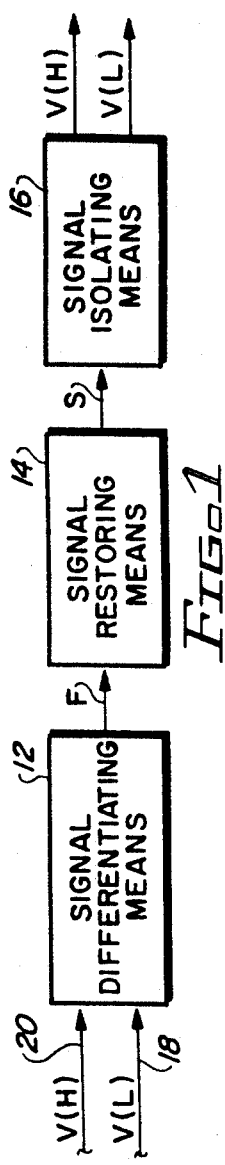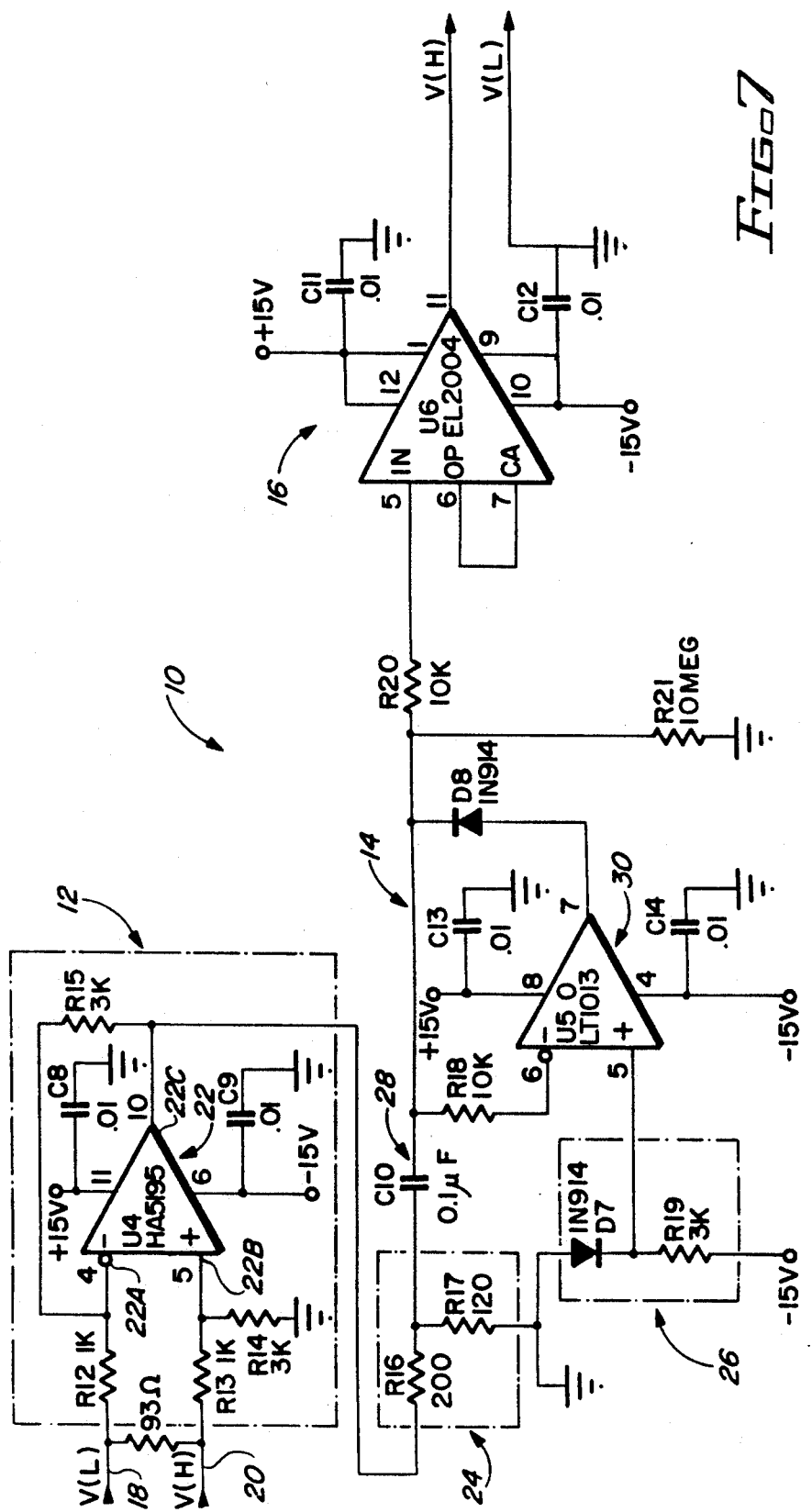

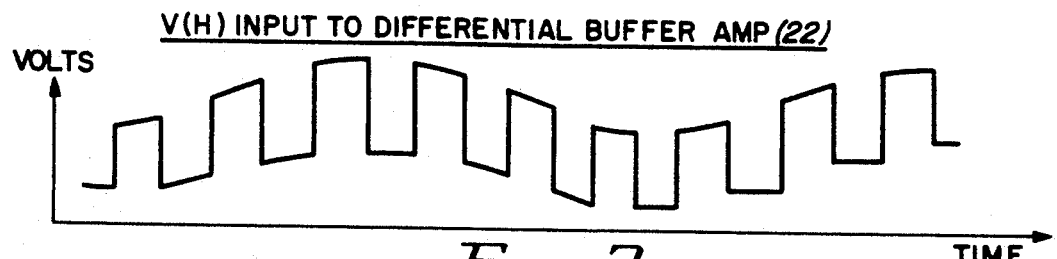
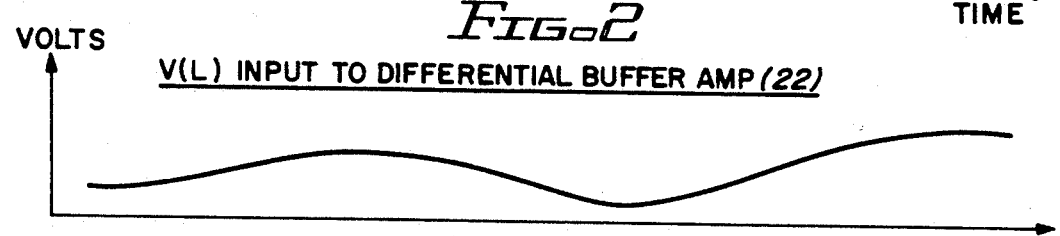
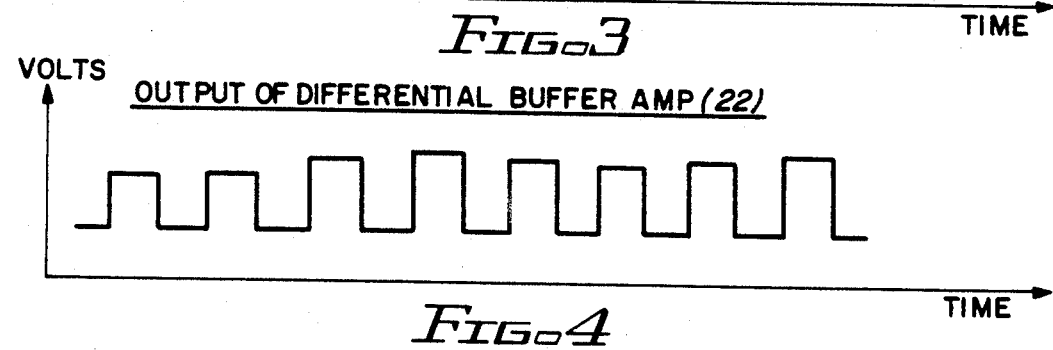
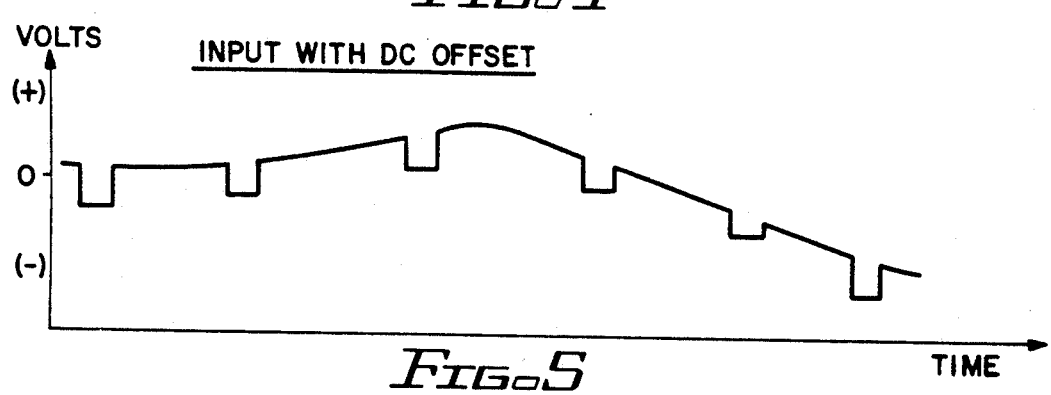
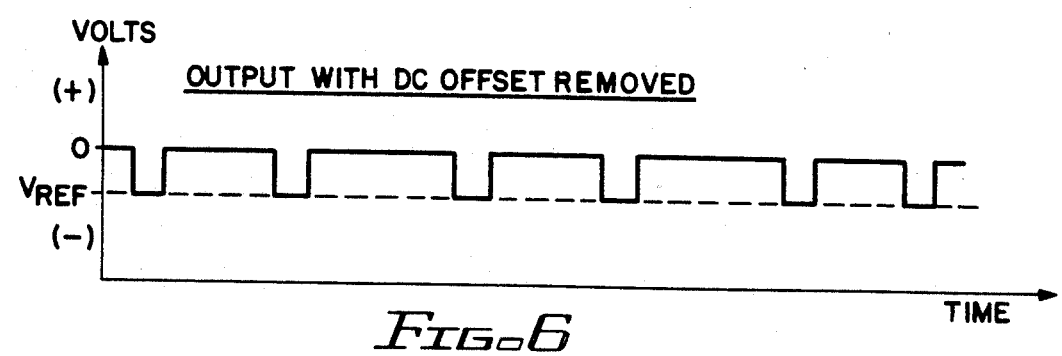

ns stabiliz
VIDEO SIGNAL FILTER METHOD AND CIRCUIT

BACKGROUND OF THE INVENTION

1. Field of the Invention

The present invention generally relates to signal filtering and restoring techniques and, more particularly, to a video signal filtering method and circuit for removing noise and providing clean information-bearing video signals.

2. Description of the Prior Art

Video signals frequently must be sent over transmission lines found in harsh environment where they are susceptible to the injection of noise, such as electromagnetic radiation (EMR). For example, high EMR levels are present in commercial and military aircraft and remotely piloted vehicles and around factory monitors, video manufacturing line inspection systems, and recreational vehicle video systems.

For instance, in carrying out testing of military weapons, video signals from various sources are recorded onboard a test aircraft for later analysis on the ground. In many of the test aircraft, the problem is that the video information has so much noise injected onto it that it becomes virtually unusable for analysis later. After a review of this problem was carried out, the conclusion was reached that the noise was mainly due to the presence of large electromagnetic fields in the wiring bundles through which the video signals are routed.

Several different approaches, such as use of filter capacitors and video isolation transformers, were tried in an attempt to solve this problem. However, unfortunately these approaches created other problems by removing the DC reference required to properly record the video signals and not saturate any buffer amplifiers. As a consequence, a need arose for a different way to solve this problem, one that would remove the noise and provide a clean buffered video signal for recorders, without introducing a new set of problems.

SUMMARY OF THE INVENTION

It is thus an object of the present invention to provide noise-free video signals.

It is yet another object of the present invention to provide a means for removing noise from video signals.

It is still another object of the present invention to eliminate noise from a video signal without removing the D.C. reference required to properly record the video signals.

It is another object of the present invention to eliminate noise from a video signal without saturating any buffer amplifiers.

The present invention provides a video signal filtering method and circuit designed to satisfy the aforementioned need. The present invention provides a satisfactory solution to the problem by permitting the reclamation of quality data and allowing for precise post-processing of the information-bearing video signals.

Accordingly, the present invention is directed to a video signal filtering circuit which comprises: (a) signal differentiating means for receiving unfiltered high state and low state components of a video signal being substantially equally injected with electromagnetic noise and for subtracting one of the components from the other of the components so as to produce a first signal having a DC offset component and an AC data-containing component being free of noise; (b) signal restoring means for receiving the first signal and for removing the DC offset component and clamping the first signal to a preset DC reference level corresponding to a specified sync level of a standard video signal so as to produce a second signal having the AC data-containing component free of noise and being clamped to the preset DC reference level; and (c) signal buffering means for receiving the second signal and for isolating the second signal from external electronic disturbances so as to produce a noise-free AC data-containing reference level-clamped output signal for providing a filtered high-state component having syncs stabilized to the specified sync level of the standard video signal to replace the original noise-injected high-state component of the original video signal.

The present invention is also directed to a video signal filtering method which comprises the steps of: (a) receiving unfiltered high-state and low-state components of a video signal being substantially equally injected with electromagnetic noise; (b) subtracting the unfiltered high-state and low-state components of the video signal one component from the other component so as to produce a first signal having a DC offset component and an AC data-containing component being free of noise; (c) restoring the first signal to a preset DC reference level corresponding to a specified sync level of a standard video signal so as to produce a second signal having the AC data-containing component free of noise and being clamped to the preset DC reference level; and (d) isolating the second signal from external electronic disturbances so as to produce a noise-free AC data-containing reference level-clamped output signal for providing a filtered high-state component having syncs stabilized to the specified sync level of the standard video signal to replace the unfiltered noise-injected high-state component of the original video signal.

These and other object, features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a general functional block diagram of a video signal filtering circuit of the present invention.

FIG. 2 is a simplified waveform diagram depicting an unfiltered noise-injected high-state component of the video signal that is received by a signal differentiating means of the video signal filtering circuit.

FIG. 3 is a simplified waveform diagram depicting an unfiltered noise-injected low-state component of the video signal that is received by the signal differentiating means of the video signal filtering circuit.

FIG. 4 is a simplified waveform diagram depicting a noise-free AC data-containing component of a first signal that is produced by the signal differentiating means of the video signal filtering circuit.

FIG. 5 is a simplified waveform diagram depicting a DC offset component combined with the noise-free AC data-containing component of the first signal that is received by a signal restoring means of the video signal filtering circuit.

FIG. 6 is a simplified waveform diagram depicting a second signal, having the AC data-containing component being noise-free and clamped to a preset DC reference level, which is produced by the signal restoring means and which, after being isolated by a signal isolating means of the video signal filtering circuit from external electronic disturbance, provides a filtered high-state component to replace the unfiltered high-state component of the original video signal.

FIG. 7 is a detailed schematic diagram of one embodiment of the video signal filtering circuit.

DETAILED DESCRIPTION OF THE INVENTION

Referring now to the drawings, and particularly to FIG. 1, there is shown a general block diagram of a video signal filtering circuit of the present invention, being generally designated by the numeral 10. Basically, the video signal filtering circuit 10 includes a signal differentiating means 12, a signal restoring means 14, and a signal isolating means 16, being electrically connected in a serial relationship.

A video signal having unfiltered high-state and low-state components V(H), V(L) are carried on a pair of separate transmission lines 18, 20 of a transmission cable. The low-state and high-state components V(L) and V(H) of the unfiltered video signal have been injected substantially equally with the same external electromagnetic (EM) noise, for example, by EM fields surrounding the transmission lines 18, 20. FIG. 2 represents the high-state component V(H) carried on the positive line 20 of the transmission cable which contains the desired information or data being transmitted plus injected noise. FIG. 3 represents the low-state component V(L) carried on the negative, or return, line 18 of the transmission cable which can be used as a reference since it contains substantially the same noise as that injected onto the positive line 20. It should be noted that this noise could be higher or lower frequency than the data part of the video signal.

The signal differentiating means 12 of the filtering circuit 10 receives the unfiltered high-state and low-state components V(H) and V(L) of the video signal. In order to "clean up" the video signal by removing the noise, the signal differentiating means 12 functions to compare and subtract out the low-state component V(L) from the high-state component V(H) so as to produce a first signal F having an AC data-containing component substantially free of noise, as shown in simplified form in the waveform diagram of FIG. 4.

By way of example, as shown in FIG. 7, the signal differentiating means 12 includes a video operational amplifier, or op-amp, configured as a differential amplifier 22 with its inputs terminated to match the source line impedance (in the case of the aircraft this is 93 ohms but could be changed to match any system). At its negative and positive inputs 22A, 22B, the differential amplifier 22 respectively receives the low-state and high-state components V(L) and V(H) of the unfiltered video signal from the transmission lines 18, 20. The signals received at the two inputs 22A, 22B are compared by the differential amplifier 22 and the noise on the negative input 22A is subtracted out of the signal on the positive input 22B, thus creating at output 22C of the differential amplifier 22 the first signal F having the AC data-containing component with no noise, being shown in simplified form by the waveform diagram in FIG. 4, as the noise should have been removed by this subtraction of the two input signals.

A problem which the differential amplifier 22 does not solve is the unavoidable non-ideal characteristic of the transmission lines 18, 20. This characteristic of the transmission lines creates a DC offset component which varies with the amplitude and frequency of the information or data waveform. This is mostly due to the capacitive loading of the transmission lines which is frequency dependent. This problem appears as a low frequency shift in the DC offset component of the signal. In the case of a video signal, this makes the signal unusable by many devices since recorders and other devices assume that the incoming video signal has a negative sync signal at about negative 0.7 volt. Because of this shift up or down in voltage, the video devices cannot sync to the incoming video signal. Thus, the first signal F produced at the output 22C of the differential amplifier 22 is an amplified AC signal inherently having a DC offset component, as shown in simplified form by the waveform diagram in FIG. 5, which is dependent on the input signals.

The problem left unsolved by the signal differentiating means 12 at the first stage of the filtering circuit 10 is solved by the signal restoring means 14 at the second stage of the filtering circuit 10. The signal restoring means 14 receives the first output signal F accompanied by the inherent DC offset component from the signal differentiating means 12 and functions to restore the first signal F to a preset DC reference level corresponding to a specified sync level of a standard video signal. As a result, the signal restoring means 14 produces a second signal S having the AC data-containing component free of noise and clamped to the preset DC reference level, as shown in simplified form by the waveform diagram in FIG. 6.

The design of the signal restoring means 14 is based on several assumptions about the desired reference point of the output signal. In the case of a video signal, the output waveform has a maximum level of about a negative 0.7 volt and this negative going pulse has an associated frequency, in this case of 15,750 Hz. By way of example, as shown in FIG. 7, the signal restoring means 14 includes a voltage divider 24 for reducing the three-volt output of the differential amplifier 22 down to one volt, means 26 for producing a preset DC reference level voltage, means 28 for removing the DC offset component, and a DC clamp 30. The voltage divider 24 is made up of resistors R16 and R17. The DC reference level voltage producing means 26 is a diode D7 and resistor R19 which set a maximum negative DC of 0.7 volt. The DC offset component removing means 28 is a capacitor C10 which passes only the AC component of the first signal F. An operational amplifier U5 and diode D8 are configured to function as the DC clamp 30.

The DC clamp 30 compares the AC component of the first signal on its negative input to the preset DC reference voltage on its positive input. At the output of the DC clamp 30, current is injected through the diode D8 into the AC component passed by the capacitor C10 to maintain its negative peak at the reference level. A resistor R21 of ten megohms is provided on the output of the DC clamp 30 to provide a discharge of the capacitor C10 for each cycle of operation of the DC clamp 30. The response time of the capacitor C10 is slow enough as to not affect the information carried by the AC data-containing component, but fast enough to remove the varying DC offset component caused by the transmission line. FIG. 5 is an example of the varying input and FIG. 6 shows the effect of the DC clamp 30 thereon.

The above-described negative clamping works well for video since the negative peaks are the vertical and horizontal syncs which should always be at a constant negative level of negative 0.7 volt. This provides a clean video that has the syncs stabilized to negative 0.7 volt (which is the specified level of standard video).

To keep this second signal S from being corrupted by line impedance or other external conditions, at the third stage of the filtering circuit 10 the signal is buffered through the signal isolating means 16. The signal isolating means 16 receives the second signal S from the signal restoring means 14 and functions to isolate the second signal from external electronic disturbances so as to produce a noise-free AC data-containing reference level-clamped output signal for providing a filtered high-state component having syncs stabilized to the specified sync level of the standard video signal to replace the unfiltered noise-injected high-state component of the original video signal.

By way of example, as shown in FIG. 7, the signal buffering means can take the form of a unity gain video buffer U6. The unity gain buffer or amplifier U6 isolates the DC clamp 30 from the outside world since different devices which the filtering circuit 10 may be connected to can have different input characteristics which would change the response of the DC clamp 30. The unity gain amplifier U6 is configured to have a high input impedance, to have minimal effect on the DC clamp 30, and a high output drive capability to allow it to drive most any outside world device.

As mentioned earlier, FIG. 7 is a detailed schematic diagram of one exemplary embodiment of the video signal filtering circuit 10. Also, FIG. 7 sets forth the preferred values for the various resistors and capacitors and the product reference numbers for the op-amps and diodes used in the filtering circuit 10.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. A video signal filtering circuit, comprising:
   (a) signal differentiating means for receiving unfiltered high state and low state components of an original video signal being substantially equally injected with electromagnetic noise and for subtracting one of said components from the other of said components so as to produce a first signal having a DC offset component and an AC data-containing component free of noise;
   (b) signal restoring means for receiving said first signal and for removing said DC offset component and clamping said first signal to a preset DC reference level corresponding to a specified sync level of a standard video signal so as to produce a second signal having said AC data-containing component free of noise and being clamped to said preset DC reference level; and
   (c) signal buffering means for receiving said second signal and for isolating said second signal from external electronic disturbances so as to produce a noise-free AC data-containing reference level-clamped output signal for providing a filtered high-state component having syncs stabilized to the specified sync level of the standard video signal to replace said original noise-injected high-state component of said original video signal.

2. The circuit of claim 1 wherein said signal differentiating means includes a differential buffer amplifier having positive and negative inputs for respectively receiving said unfiltered high-state and low-state components of the video signal from positive and negative sides of a transmission line onto which has been uniformly injected electromagnetic noise from external sources.

3. The circuit of claim 2 wherein said differential buffer amplifier has an output and is operable to subtract said low-state component from said high-state component of the video signal so as to produce at said output said first signal from which the injected-noise has been subtracted but which has said DC offset component.

4. The circuit of claim 1 wherein said signal restoring means includes first means having an input and an output, said first means being connected at said input to said signal differentiating means for receiving said first signal and being operable to remove said DC offset component therefrom and pass said noise-free AC data-containing component at said output of said first portion.

5. The circuit of claim 4 wherein said first means is a capacitor.

6. The circuit of claim 4 wherein said signal restoring means also includes second means having an input and an output, said second means being connected at said input to said output of said signal differentiating means for receiving said first signal and being operable to produce said preset DC reference level signal.

7. The circuit of claim 6 wherein said second means is a diode.

8. The circuit of claim 6 wherein said signal restoring means further includes third means having positive and negative inputs and an output, said third means being respectively connected at said positive and negative inputs to said outputs of said second means and first means and being operable to clamp said noise-free AC data-containing output signal outputted by said first means to said preset DC reference level corresponding to a specified sync level of a standard video signal and to produce said second signal having said AC data-containing component free of noise and being clamped to said preset DC reference level.

9. The circuit of claim 8 wherein said third means is an operational amplifier configured as a DC clamp.

10. The circuit of claim 8 wherein said signal buffering means has an input connected to said outputs of said first means and third means of said signal clamping means for receiving said second signal, said signal buffering means having an output and being operable to isolate said second signal from external influences and produce said noise-free AC data-containing reference level-clamped output signal.

11. A video signal filtering method, comprising the steps of:

(a) receiving unfiltered high-state and low-state components of an original video signal being substantially equally injected with electromagnetic noise;

(b) subtracting said unfiltered high-state and low-state components of said video signal one component from the other component so as to produce a first signal having a DC offset component and an AC data-containing component being free of noise;

(c) restoring said first signal to a preset DC reference level corresponding to a specified sync level of a standard video signal so as to produce a second signal having said AC data-containing component free of noise and being clamped to said preset DC reference level; and (d) isolating said second signal from external electronic disturbances so as to produce noise-free AC data-containing reference level-clamped output signal for providing a filtered high-state component having syncs stabilized to the specified sync level of the standard video signal to replace said unfiltered noise-injected high-state component of said original video signal.

12. The method of claim 11 wherein said restoring includes removing said DC offset component of said first signal.

13. The method of claim 12 wherein said restoring includes passing said AC data-containing component of said first signal.

14. The method of claim 11 wherein said restoring includes producing said DC reference level signal.

15. The method of claim 14 wherein said restoring also includes clamping said first signal to said preset DC reference level corresponding to the specified sync level of the standard video signal so as to produce said second signal having said AC data-containing component free of noise and being clamped to said preset DC reference level.

* * * * *